United States Patent [19]

Uitermarkt

[11] 4,442,877
[45] Apr. 17, 1984

[54] MACHINE CONTROL SYSTEM FOR A WOOD OR BRUSH CHIPPING MACHINE

[75] Inventor: Edward L. Uitermarkt, Pella, Iowa

[73] Assignee: Vermeer Manufacturing Company, Pella, Iowa

[21] Appl. No.: 379,150

[22] Filed: May 17, 1982

[51] Int. Cl.³ .............................................. B27L 11/00
[52] U.S. Cl. .................................... 144/172; 144/375; 241/101.7
[58] Field of Search .............................. 144/172, 176; 241/101.7, 37.5; 222/511

[56] References Cited

U.S. PATENT DOCUMENTS 4,260,114 4/1981 Herder ........................... 241/101.7

*Primary Examiner*—W. D. Bray
*Assistant Examiner*—Jorji M. Griffin
*Attorney, Agent, or Firm*—Rudolph L. Lowell

[57] ABSTRACT

A material feed control mechanism for a wood or brush chipper having an upright stop gate vertically movable to a material obstructing position extended transversely across and within the feed housing, and forwardly of the cutter to a material non-obstructing position projected upwardly from the housing. A latch assembly for releasably holding the stop gate in the material non-obstructing position associated with a release mechanism actuated by a lever system operable independently by any one of a plurality of handles one of which is arranged forwardly of the feed housing and a pair of which are located at opposite sides of the feed housing, to permit the fall of the gate to the material obstructing position therefor.

8 Claims, 6 Drawing Figures

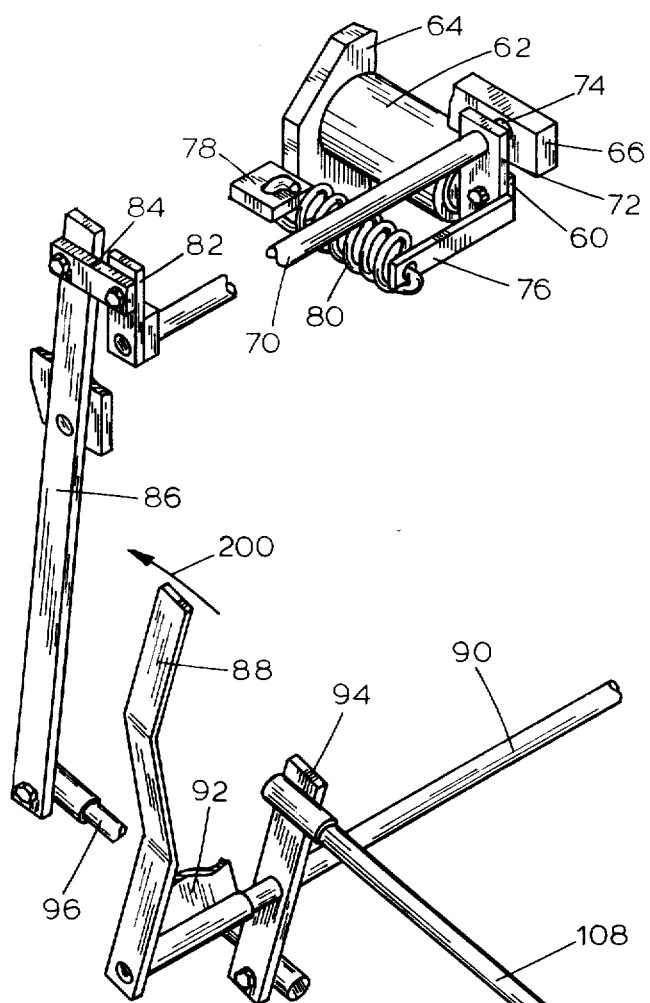
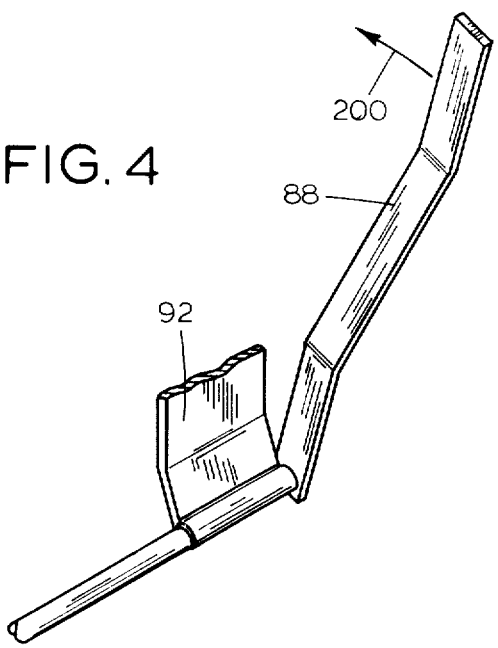
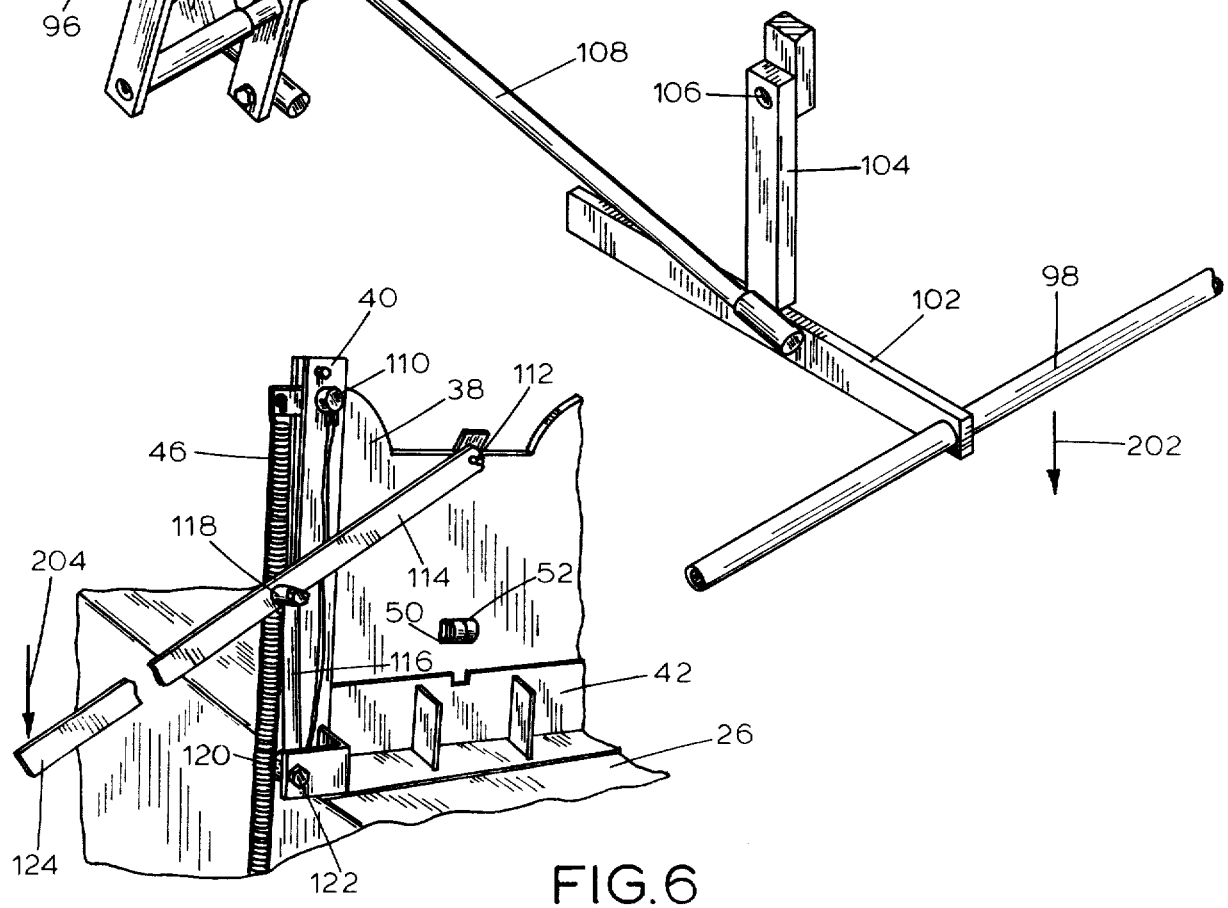
FIG. 4
FIG. 6

MACHINE CONTROL SYSTEM FOR A WOOD OR BRUSH CHIPPING MACHINE

BACKGROUND OF THE INVENTION

Wood and brush chippers generally require a relatively heavy high speed rotary cutter which, due to its rotative momentum, is unable to be easily or quickly stopped in the event of an emergency, for example, to prevent possible injury to the operator or damage to the cutter by the accidental feeding thereto of material having hidden metallic plates, nails or the like.

In U.S. Pat. No. 3,182,917, an engine cut-out and cutter brake mechanism may be triggered by the manual actuation of either one of a pair of arms carried at opposite sides of material feed chute.

The throw out assembly of U.S. Pat. No. 3,819,121 is actuated by a pair of manually operable levers arranged at opposite sides of the material receiving platform, to permit tilting of the platform downwardly from the cutter concurrently with breaking the engine drive to the cutter.

The safety device of U.S. Pat. No. 4,260,114 has a plate supported for pivotal movement, from a substantially horizontal rest position, downwardly and forwardly into the material so as to be drawn thereby to an upright material obstructing position, or to a downwardly and forwardly inclined position wherein the material is wedged between the lower edge of the plate and the bottom wall of the feed chute. The plate is released to a material obstructing position by pivotal downward movement of the feed table when a weight in excess of a normal load of material is placed on the feed table.

SUMMARY OF THE INVENTION

The instant invention comprising a material feed control mechanism for a wood or brush chipping machine is efficient in operation to obstruct the feed of material into the cutter by release means independently actuated from a plurality of operating stations located exteriorly of the machine and about the feed inlet thereof. The stop gate, in a material obstructing position extends transversely across and within the housing, and is manually vertically moved to a material non-obstructing position projected upwardly and outwardly of the housing by a removable handle means. On actuation of the release means, which is interconnected by a lever system to a handle at each operating station, the stop gate falls to the material obstructing position therefor. The fall of the stop gate is accelerated by the action of coil tension springs which are in extended positions when the stop gate is in the non-obstructing position. On initial downward movement of the stop gate, the cutter motor is stopped by the opening of an electrical cut-out switch. Concurrently with a stopping of the cutter, the cutter is either fully isolated from incoming material by the stop gate, or the material is clamped against feeding movement into the cutter between the lower edge of the stop gate and the bottom wall of the feed housing. In either case, material feed stoppage takes place positively and quickly. On raising of the gate to the normal or non-obstructing position therefor, any foreign material may be removed from the machine and operation thereof resumed by resetting the motor cut-out switch.

DESCRIPTION OF THE DRAWINGS

FIG. 4 is a perspective view of the lever system for actuating the stop gate releasing mechanism;

FIG. 5 is a perspective view of the stop gate latching means; and

FIG. 6 is a detailed view showing the demountable handle means for elevating the stop gate to the rest or non-obstructing material position therefor.

DETAILED DESCRIPTION OF THE PREFERRED EMBODIMENT

Figure 1:
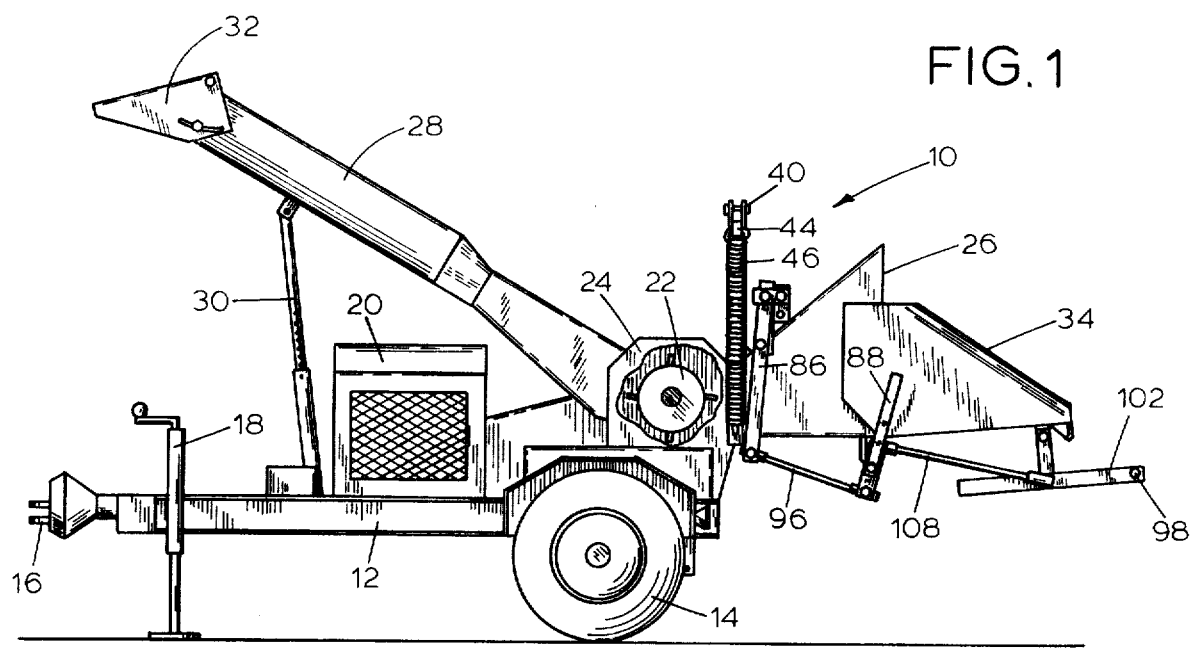
FIG. 1 is a side elevational view of the chipper machine, with parts removed and other parts shown in section, illustrating the assembly relation of the cutter with a stop gate of the control mechanism.

The material feed control system for a wood or brush chipping machine, generally designated at 10, as shown in combination with a conventional chipping machine in FIG. 1. The chipping machine comprises a frame structure 12 carried on wheels 14 and presents a hitch 16 which may be coupled to a vehicle for moving the machine from place to place. Upon unhitching of the chipper machine from a vehicle, a vertical elevation jack 18 is provided to maintain appropriate elevation of the chipping machine.

Mounted on frame 12 is a driving engine 20 which provides motive force to a chipper rotor 22, shown in cut-away view in FIG. 1. The chipper rotor 22 is enclosed in a rotor housing 24. A feed throat 26 provides access to the internal space within the housing 24 on the input side of the chipper rotor 22. A discharge chute 28 is also in communication with the rotor housing 24 to receive the chipped output product from the chipper rotor 22 and to direct the product away from the chipping machine. An adjustable support member 30 is a telescoping, or otherwise extensible, support means for elevating the discharge chute 28 to any of several selected vertical heights. A deflector hood 32 is rotatably mounted on the discharge end of the discharge chute 28 in a manner such that chips may be deflected in a wide variety of directions.

A feed table 34 is hingedly affixed to the feed throat 26 in a manner such that the angle of the feed table 34 with respect to the floor of the feed throat 26 may be varied, and the feed table 34 may be raised to a generally vertical position during transport of the chipping machine.

Figure 2:
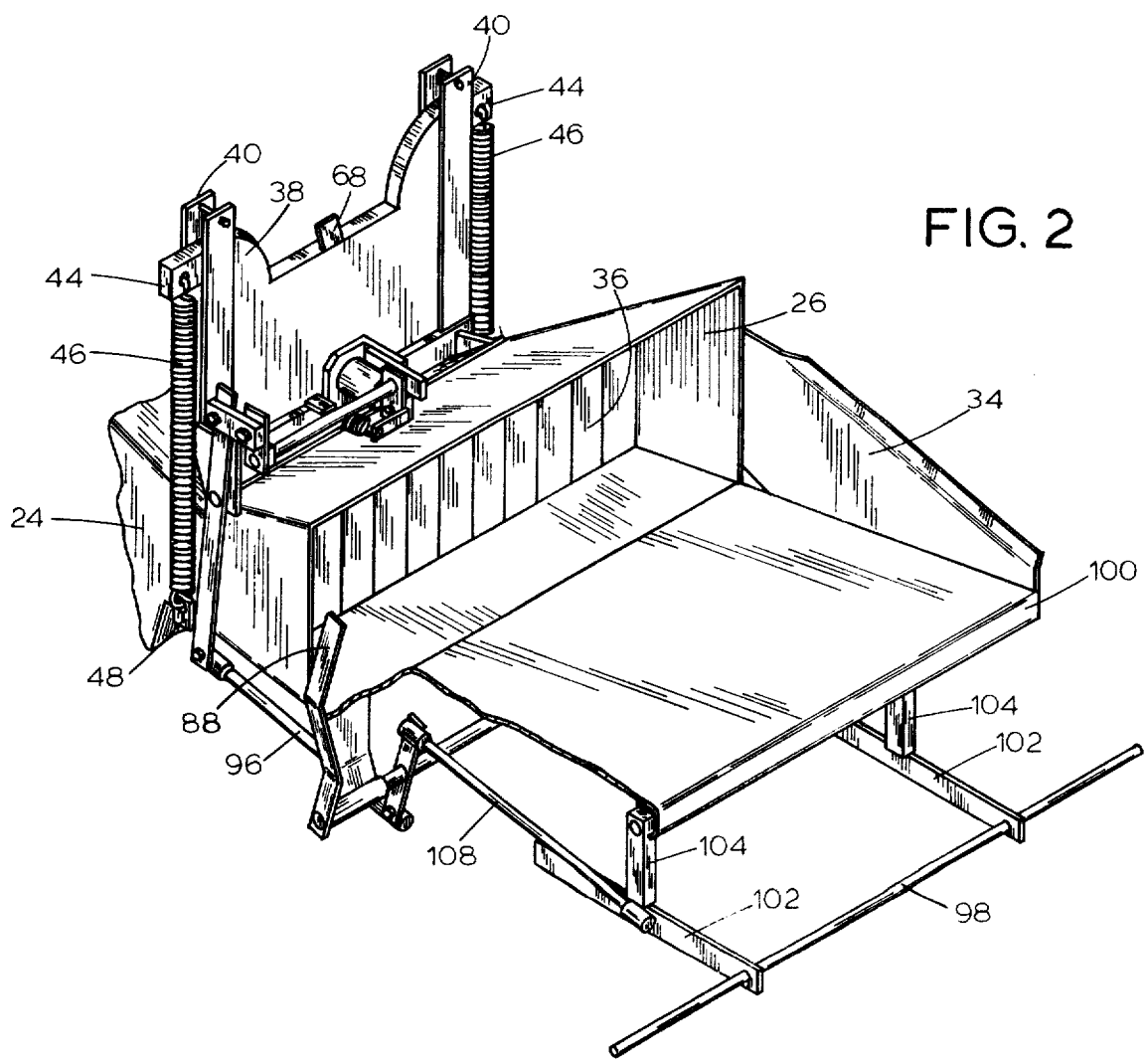
FIG. 2 is a perspective view of a brush chipping machine particularly illustrating the assembly thereon of the material feed control mechanism of the invention.

As shown in FIG. 2, a plurality of flexible shield strips 36 are suspended within the feed throat 26 to prevent ejection through the feed throat 26 of chips, rocks, or other materials which might be propelled or otherwise deflected by the chipper rotor 22. As further illustrated in FIG. 2, the preferred embodiment of the instant invention employs an upright, vertically movable feed stop gate 38 which may be forcibly and quickly lowered into the feed throat 26 in order to isolate the feed throat 26 from the chipper rotor 22.

Figure 3:
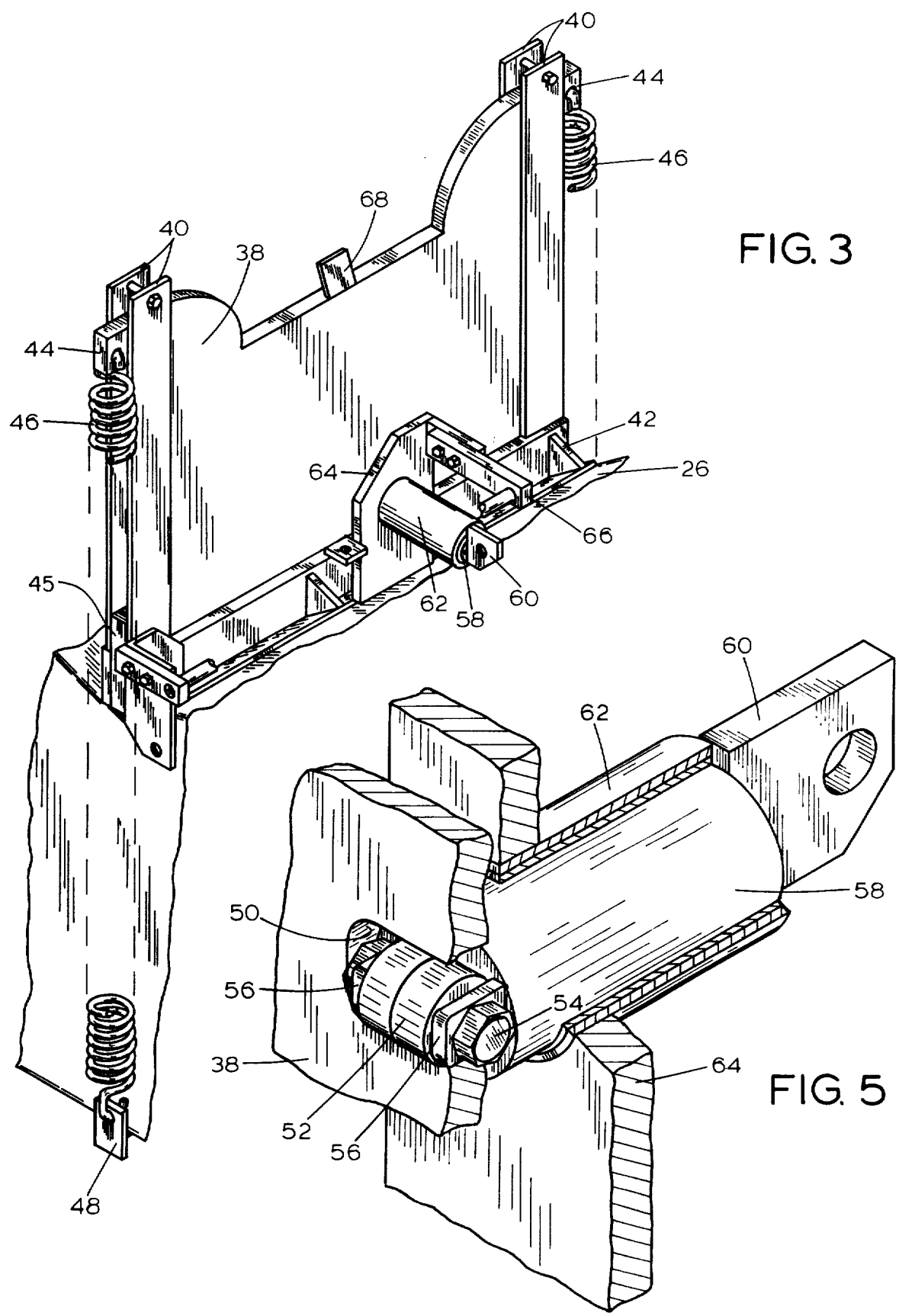
FIG. 3 is a perspective view of the frame structure for supporting a vertically movable stop gate and the releasable latch means therefor.

As shown in FIG. 3, the feed stop gate 38 is guidably retained between vertical guide members 40. The vertical guide members 40 are rigidly affixed to a feed gate frame member 42, which is in turn rigidly mounted on the top side of the feed throat 26. The feed stop gate 38 presents two tension spring attachment sites 44 which extend outwardly beyond the vertical guide members 40 and which have an aperture for receiving one end of a tension spring 46. The other end of each tension spring 46 is retained by tension spring anchor members 48 positioned on opposite sides of the feed throat 26 in a position directly beneath the tension spring attachment sites 44 and at a vertical distance therefrom such that the tension springs 46 remain axially tensioned when the feed stop gate 38 is fully lowered into the feed throat 26. The attachment sites 44 in conjunction with spacer blocks 45, located between the lower ends of each pair of upright guide members 40, function as co-acting abutment members to define the lowered position of the stop gate 38.

As shown in FIG. 5, a generally elongate latch aperture 50 is formed in the stop gate 38, and is of sufficient size to receive a latch roller 52, which may be extended from one side of the feed stop gate 38, through the latch aperture 50 and at least partially beyond the other side of the feed stop gate 38. It should be noted, that the latch aperture 50 is formed on the feed stop gate 38 in a position at which the latch roller 52 extends at least partially through the aperture 50, when the feed stop gate 38 in a raised position with respect to the feed throat 26, thereby holding the feed stop gate 38 in the raised position. In addition, the latch roller 52, in association with a latch roller tab 68 (see FIG. 3), assists in retaining the feed stop gate 38 in a fully lowered position with respect to the feed throat 26. The latch roller 52 is carried on a roller shaft 54 between roller retaining members 56. The roller retaining members 56 are carried on the end of a latch cylinder 58. At the opposite end of the latch cylinder 58, is a latch cylinder attachment member 60. The latch cylinder 58 is positioned in telescopically movable relation with a latch cylinder housing 62. The latch cylinder housing 62 is rigidly affixed to the feed gate frame member 42 through a latch retaining bracket 64. A latch action frame member 66 (see FIG. 3) is attached to the latch retaining bracket 64 in a manner such that the latch action frame member 66 is oriented generally perpendicular to the latch retaining bracket 64 and extends at least as far from the latch retaining bracket 64 as the latch cylinder attachment member 60 when the latch roller 52 is engaged in the aperture 50.

As illustrated in FIG. 4, the latch action frame member 66 has an aperture which serves as a pivot point 74 for a latch action rock shaft 70. One arm 72 of the latch action rock shaft 70 is rotatably coupled with the latch cylinder attachment member 60 in a manner such that the rotation of the rock shaft 70 about the pivot point 74 causes the latch roller 52 to disengage from the aperture 50 in the feed stop gate 38 (see FIG. 5). A latch spring attachment arm 76 is also coupled to the arm 72 of the rock shaft 70, and, in cooperation with a latch spring anchor site 78 and a latch spring 80, the latch spring attachment arm 76 imparts axial force along the latch cylinder 58 to cause the latch roller 52 to engage the aperture 50 or, when feed stop gate 38 is lowered, to engage the roller tab 68. As illustrated in FIG. 4, the rock shaft 70 has a second arm 82 which is mechanically connected to a coupling link 84 and a coupling lever 86.

A feed stop operating lever 88 is positioned on each side of the feed throat 26 and are coupled with one another through a coupling shaft 90. The coupling shaft 90 is suspended below the feed throat 26 by coupling shaft support members 92. An actuating lever 94 is rigidly affixed at its center to the coupling shaft 90. A connecting rod 96 mechanically couples the actuating lever 94 with the coupling lever 86 in a manner such that movement of the feed stop operating levers 88 in a direction generally designated by arrows 200 will cause the latch cylinder 58 to disengage the latch roller 52 from the aperture 50, thereby permitting the feed stop gate 38 to enter the feed throat 26 under the force provided by the tension springs 46.

A feed stop operating bar 98 is positioned generally parallel to, forwardly of, and slightly below the edge 100 (see FIG. 2) of the feed table 34. The feed stop operating bar 98 is retained at the ends of cantilever bars 102, which are in turn suspended from the feed table 34 by suspension members 104. The cantilever bars 102 and the suspension members 104 combine to provide a crank which translates movement of the feed stop operating bar 98 in a direction generally designated 202 into angular movement of the suspension member 104 about a suspension member pivot 106. A connecting rod 108 transfers generally angular movement of the suspension member 104 to the actuating lever 94. Accordingly, movement of the feed stop operating bar 98 in a direction generally designated 202, through a series of levers and links, causes the rock shaft 70 to move the latch cylinder 58 making the latch roller 52 disengage from the latch aperture 50, thereby permitting the feed stop gate 38 to lower into the feed throat 26 through the force provided by the tension springs 46.

As shown in FIG. 6, an engine interrupt switch 110 is provided on one of the vertical guide members 40. When the feed stop gate 38 is lowered into the feed throat 26, the engine interrupt switch 110 breaks the electrical ignition circuit of the engine 20, thereby causing the engine to cease driving the chipper rotor 22.

The feed stop gate 38, on the side opposite the latch cylinder 58, carries a gate raising pin 112 which may be releasably engaged by a gate raising lever 114. The gate raising lever 114 is rotatably coupled to the feed gate frame member 42 through a coupling support member 116. The coupling support member 116 is pivotally mounted on the gate raising lever 114 through a pivot 118. The other end of the coupling support member 116 is releasably coupled with the feed gate frame member 42 through a sleeve 120 in combination with a stub shaft 122. Accordingly, the gate raising lever 114, together with the coupling support 116 may be readily removed from the pin 112 and the stub shaft 122 to permit the gate raising lever assembly to be stored separately from the feed stop gate assembly.

In the event the feed stop gate 38 is lowered into the feed throat 26, the gate raising lever 114 is coupled with the gate raising pin 112, and the coupling support 116 is coupled, through the sleeve 120, with the stub shaft 122. Downward manual force in a direction generally designated 204 on the free end 124 of the gate raising lever 114 causes the feed stop gate 38 to be raised, against the tension in springs 46, out of the feed throat 26, to a point where the latch roller 52 engages the latch aperture 50, at which time the gate raising lever 114 may be removed from the assembly and stored separately. Although the gate raising lever 114 and its associated coupling support 116 could be non-releasably coupled with the feed stop gate 38 and the stub shaft 122, it has been found, in the preferred embodiment of the invention, to be desirable to utilize a releasable gate raising mechanism.

It should be noted that the present invention accommodates rapid and positive interruption of both the feeding of material as well as of the motor operation through use of readily accessible controls 88 and 98 located on all exterior sides of feed table 34. In addition, the stopping action of the feed stop gate 38 is positive and forceful as a result of the force produced by the tension springs 46. The resulting system provides for operator safety and rapid response to unexpected conditions which may arise in the course of operation of a wood or brush chipping machine.

It should be clear from the foregoing description of the preferred embodiment that other mechanical means could be employed in accomplishing the broad purposes of the invention. It should be understood that this description is intended to illustrate but not to limit the scope of the invention as defined in the following claims.

I claim:

1. A material feed control mechanism for a wood or brush chipping machine having a housing with a material receiving inlet and an outlet for delivering material to a cutter located rearwardly of and adjacent to said outlet, said control mechanism comprising:
   (a) an upright material stop gate located forwardly of and adjacent to the housing outlet,
   (b) means guidably supporting the stop gate on said housing for vertical movement to an elevated position projected upwardly from the housing to open the outlet to said cutter, and to a lowered position to block material from passing through said outlet to said cutter,
   (c) latch means on said housing for releasably holding the stop gate in the elevated position therefor,
   (d) a mechanism on said housing for releasing said latch means to drop the stop gate to the lowered position therefor including an operating lever,
   (e) a lever system mounted on said housing for actuating said operating lever,
   (f) gate detachable means for manually raising said stop gate to the elevated position therefor to provide for a free fall of the stop gate to the lowered position therefor, and
   (g) power means complementing said free fall to forcibly urge the stop gate to said lowered position concurrently with the release of said latch means.

2. The material feed control mechanism of claim 1, including:
   (a) gate detachable means for manually raising said stop gate to the elevated position therefor to provide for a free fall of the stop gate to the lowered position therefor, and
   (b) power means complementing said free fall to forcibly urge the stop gate to said lowered position concurrently with the release of said holding means.

3. The material feed control mechanism of claim 1, wherein:
   (a) said gate detachable means includes an elongated handle,
   (b) means releasably pivotally supporting said handle means intermediate the ends thereof on said housing for pivotal movement in a plane parallel to and adjacent the plane of the stop gate, with one end of said handle means projected laterally outwardly from the housing,
   (c) said stop gate having an upper portion thereof exteriorly of the housing in the lowered position therefor, and
   (d) coacting releasable connecting means on said gate upper portion and on the other end of said handle.

4. A material feed control mechanism for a wood or brush chipping machine having a housing with a material receiving inlet and an outlet for delivering material to a cutter located rearwardly of and adjacent to said outlet, said control mechanism comprising:
   (a) an upright material stop gate located forwardly of and adjacent to the housing outlet,
   (b) means guidably supporting the stop gate on said housing for vertical movement to an elevated position projected upwardly from the housing to open the outlet to said cutter, and to a lowered position to block material from passing through said outlet to said cutter,
   (c) latch means on said housing for releasably holding the stop gate in the elevated position therefor,
   (d) a mechanism on said housing for releasing said latch means to drop the stop gate to the lowered position therefor including an operating lever,
   (e) a lever system mounted on said housing for actuating said operating lever,
   (f) said stop gate guidable means including a pair of upright guideways spaced transversely of and projected upwardly from said housing,
   (g) said housing having a top wall formed with an elongated transverse opening for receiving the stop gate therethrough having terminal ends at said guideways, and
   (h) a transverse guideway including a pair of guide members mounted on said housing top wall at opposite sides of the opening therein,
   (i) said stop gate having an upper portion extended upwardly from said transverse guideway in the lowered position of the stop gate, and
   (j) coating abutment members on said upper portion and on said transverse guideway for defining the lowered position of said stop gate.

5. The material feed control mechanism according to claim 4, wherein:
   (a) said releasable holding latch means includes a latch member,
   (b) a latch engaging means on said stop gate,
   (c) means on said housing top wall supporting said latch member forwardly of said stop gate for movement into and out of engagement with said latch engaging means, and
   (d) means for yieldably urging the latch member into said engagement with the latch engaging means,
   (e) said latch member, on actuation of said releasing mechanism being moved out of engagement with said latch engaging means against the action of said yieldable means.

6. The material feed control mechanism of claim 5, wherein:
   (a) said latch engaging means comprises a shoulder portion on said stop gate located within the laterial confines of the stop gate, and
   (b) said latch member includes a linearly movable body member having a roller means adjacent one end thereof engageable with said shoulder portion.

7. The material feed control mechanism according to claim 5, wherein:
   (a) said releasing mechanism includes a transverse rock shaft pivotally supported on the housing top wall forwardly of said latch member and having a pair of axially spaced rock arms thereon,
(b) means pivotally connecting a first one of said rock arms to said latch member,
(c) means interconnecting said yieldable means with said one rock arm and housing top wall to rock said shaft in one direction to a latch engaging position of said latch member, and
(d) means connecting the second one of said rock arms to said lever system for actuation of said rock shaft in an opposite direction to move the latch member out of latching engagement with the stop gate.

8. A material feed control mechanism for a wood or brush chipping machine having a housing with a material receiving inlet and an outlet for delivering material to a cutter located rearwardly of and adjacent to said outlet, said control mechanism comprising:
(a) an upright material stop gate located forwardly of and adjacent to the housing outlet,
(b) means guidably supporting the stop gate on said housing for vertical movement to an elevated position projected upwardly from the housing to open the outlet to said cutter, and to a lowered position to block material from passing through said outlet to said cutter,
(c) latch means on said housing for releasably holding the stop gate in the elevated position therefor,
(d) a mechanism on said housing for releasing said latch means to drop the stop gate to the lowered position therefor including an operating lever,
(e) a lever system mounted on said housing for actuating said operating lever,
(f) said lever system including a handle extended transversely of and arranged forwardly of and below the housing inlet, and a pair of upright transversely spaced handles arranged to opposite sides of the housing rearwardly of said horizontal handle, and
(g) means interconnecting said operating lever with said horizontal handle and a pair of upright handles for independent operation of said lever system by each of said handles.

* * * * *